May 14, 1957  J. R. BURNS  2,791,794
AUTOMOBILE DOOR HINGE
Filed April 12, 1954  2 Sheets-Sheet 1
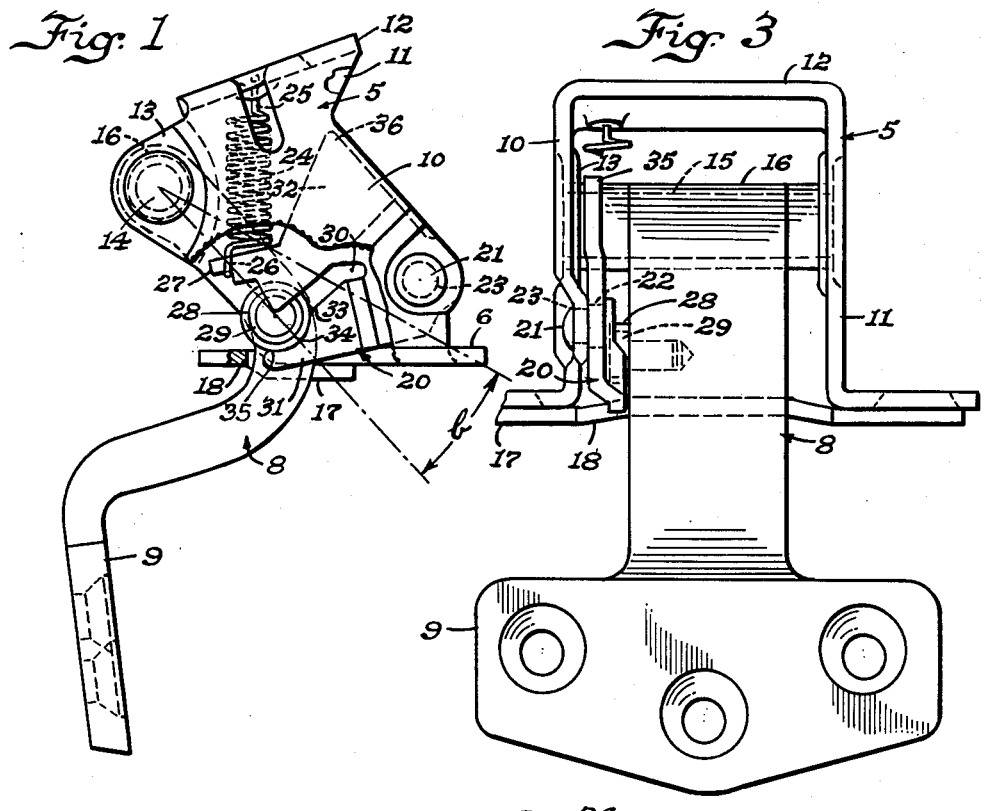
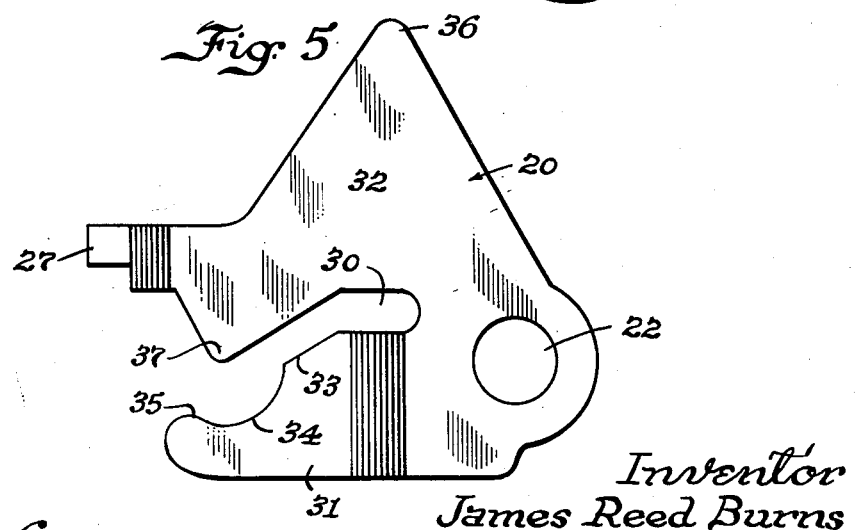
Inventor
James Reed Burns
Andrew F. Wintercorn
Atty.

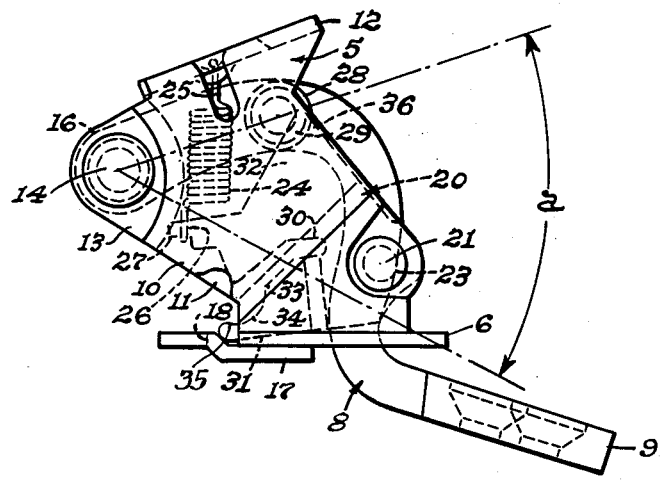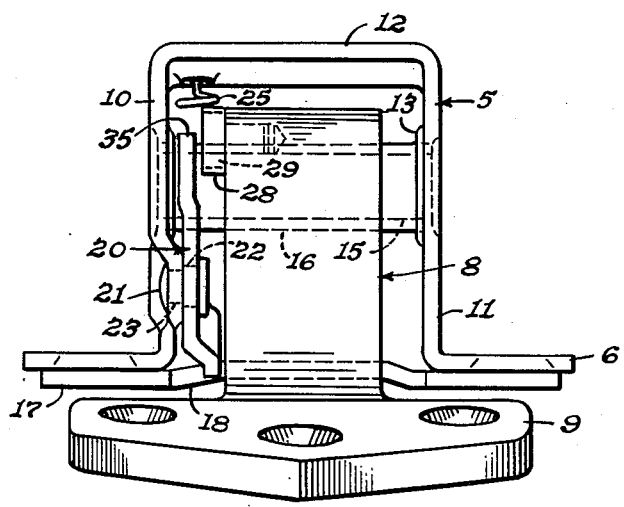

United States Patent Office 2,791,794
Patented May 14, 1957

2,791,794
AUTOMOBILE DOOR HINGE

James Reed Burns, Rockford, Ill., assignor to Atwood Vacuum Machine Company, Rockford, Ill., a corporation of Illinois Application April 12, 1954, Serial No. 422,384

4 Claims. (Cl. 16—146)

This invention relates to automobile door hinges, and is more particularly concerned with the provision of a novel form of hold-open device designed to serve also as an assist.

Various designs of hold-open devices have been proposed, but many are too complicated and expensive in construction and also are not practical for various reasons. It is, therefore, the principal object of my invention to provide a combination hold-open and assist device of simpler and less expensive construction, and one which is thoroughly practical and serviceable and is not apt to require any attention.

In the hinge of my invention, an elongated arm or cam, that is designed to be punched from sheet metal at low cost, is pivotally mounted on a rivet on one of the horizontal walls of the cage of a concealed hinge, and has a tension spring connected therewith urging the cam in a direction for abutment with an anti-friction roller carried on a pin projecting from the edge of the gooseneck portion of the inner member of the hinge, so that the cam is oscillated in a predetermined relationship to the opening of the door, and, partly because of the spring pressure active thereon and partly because of the profile on the cam, will exert a predetermined assist and hold-open action. The cam is slotted to define two portions and has the profiled portion thereof on one side of the slot and in one plane in downwardly offset parallel relation to another portion on the other side of the slot, and the roller is arranged to ride onto the profiled portion only in the last 20° or so of the approximately 90° range of opening movement of the door so that the door is operable both ways with entire freedom and no restraint whatever in the usual range of door movement, to assist and hold-open action being obtained only when the door is swung all the way open. By special forming of the outermost portion of the profiled portion, a checking or cushioning action is also derived that is beneficial especially when the door is thrown open more or less violently. That portion of the cam on the other side of the slot from the profiled portion is shaped to overlie the roller in all positions of the door, whereby to serve as a retainer for the roller preventing displacement thereof off the pin.

The invention is illustrated in the accompanying drawings, in which—

Figs. 1 and 2 are plan views of an automobile door hinge made in accordance with my invention, the hinge being shown in open position in Fig. 1 and in closed position in Fig. 2;

Figs. 3 and 4 are side views of Figs. 1 and 2, respectively, which serve to better illustrate the construction, the spring being omitted in these views, and Figs. 5 and 6 are two views of the cam on an enlarged scale.

The same reference numerals are applied to corresponding parts in these six views.

Referring to the drawings, the automobile door hinge shown is of the well known concealed type, similar, for example, to that shown in the Harmon et al. Patent 2,322,933, issued June 29, 1943. It comprises an outer sheet metal cage member 5 adapted to be mounted by means of its attaching flanges 6 on the door pillar on the body, and a gooseneck-shaped inner member 8 mounted on the door by means of its attaching end portion 9. The outer cage member 5 is formed from sheet metal to a generally U-shaped cross-section so as to provide opposed, substantially parallel, horizontally extending walls 10 and 11, connected by a substantially vertical wall 12. The horizontal walls 10 and 11 have embossed portions 13 forming supports for the pintle 14, which is received in a bearing hole 15 provided therefor in the enlarged end portion 16 of the inner hinge member 8. A plate 17 is welded onto flanges 6 of the cage 5 and serves as a brace for the cage besides providing a stop 18 for engagement by the inner hinge member 8 positively to limit opening of the door fastened to said inner hinge member.

In accordance with my invention, an elongated arm or cam 20, which can be punched from sheet metal at low cost, but is preferably hardened by heat treatment to reduce wear to a minimum, is disposed in the space between the upper wall 10 of the outer hinge member and the upper edge of the inner hinge member 8, as clearly appears in Figs. 3 and 4, and is pivoted at one end on a rivet 21 entered through registering holes 22 and 23 provided in the arm 20 and upper wall 10, respectively, a coiled tension spring 24, which is attached at one end 25 to the cage 5 and at its other end 26 to a lug 27 on the free end of the arm 20, being provided to urge the arm to move always in a clockwise direction, as viewed in Figs. 1 and 2, into abutment with a roller 28 rotatable mounted on a pin 29 projecting from the edge of the gooseneck portion of the inner hinge member 8, so that the cam 20 gives a hold-open action, as well as an assist action. The cam 20 is slotted lengthwise at the middle as shown at 30 to define two portions 31 and 32 on opposite sides of the slot. Portion 31 has the major portion thereof offset downwardly relative to portion 32 in a plane parallel thereto so as to lie in the plane of operation of roller 28, and the inner edge of portion 31 is profiled to provide a cam track for roller 28 consisting of a straight edge 33 terminating at its outer end portion in a depression 34 with a rise 35 at the extremity. The portion 32 is above the plane of operation of roller 28 and overlies the anti-friction roller 28 throughout the range of door movement, so as to serve as a retainer for said roller preventing displacement thereof from the pin 29. Portion 32 has on its one side a triangular shaped extension, the apex portion 36 of which overlies the roller in the fully closed position of the door, as seen in Fig. 2, and it has on its opposite side another triangular shaped extension, the apex portion 37 of which overlies the roller in the fully opened position of the door, as seen in Fig. 1.

In operation, it should be clear from the foregoing description that the door carried by the inner hinge member 8 is swingable freely through an angle of about 60°, as indicated by angle $a$ in Fig. 2, because roller 28 does not encounter the cam track surface 33 until the door is swung nearly all the way open. It is actually only in the final 20° or so of door opening movement, as indicated by angle $b$ in Fig. 1, that the roller 28 operates on the profiled portion 31 of the cam 20, said roller riding on the straight edge 33 first to stretch the spring 24 a predetermined amount and then riding down the inclined inner side of the depression 34 to give the door an assist to its extreme open position and then hold the door open with the roller 28 engaged in the depression 34, as shown in Fig. 1. Inasmuch as a 60° or so opening movement of the door is more than enough to enable the driver to get into or out of the car it follows that most door operations will fall in the category of angle $a$, and that the combination assist and hold-open action afforded by cam 20, roller 28 and spring 24 is used only when it is needed, namely, when it is desired to hold the door open. The rise 35 on the far side of depression 34 serves to stretch the spring 24 quickly if the door has enough momentum so that the inner hinge member 8 would strike the positive stop 18 if not checked. With this cushioning or checking action the operation is quiet and there is also less strain upon the hinges. In all positions of the door, the portion 32 of the cam 20 overlies the roller 28 and prevents displacement thereof from pin 29.

It is believed the foregoing description conveys a good understanding of the objects and advantages of my invention. The appended claims have been drawn to cover all legitimate modifications and adaptations.

I claim:

1. In combination, a hinge comprising a generally U-shaped outer cage member, and an inner member having a gooseneck-shaped end portion pivoted on a pintle disposed substantially at right angles to and supported on the arms of the U-shaped member, the gooseneck portion of said inner member having substantially parallel top and bottom edges, there being a space left between one of said edges of the gooseneck portion and an adjacent arm of the outer member, said hinge members being movable relative to one another through approximately ninety degrees, an elongated arm pivoted at one end on one arm of the outer member and oscillatable in said space in a plane approximately parallel to the aforesaid edge of the gooseneck portion and adjacent arm of the outer member, a roller mounted with freedom for axial and rotary movement on a cylindrical portion of a pin projecting from the aforesaid edge of the gooseneck portion, said arm having a slot provided therein lengthwise thereof and providing on one side of the slot a cam shaped portion in one plane parallel to the aforesaid edge of the gooseneck portion for engagement by said roller in one portion of the opening movement of the hinge to provide a hold-open action for the inner member in an open position thereof, and said arm providing on the other side of the slot another portion in another plane parallel to the cam-shaped portion and arranged to lie between the outer end of the roller and the adjacent arm of the outer member to prevent displacement of the roller from the pin, and spring means urging said arm toward engagement with said roller.

2. In combination, a hinge comprising a generally U-shaped outer cage member, and an inner member having a gooseneck-shaped end portion pivoted on a pintle disposed substantially at right angles to and supported on the arms of the U-shaped member, the gooseneck portion of said inner member having substantially parallel top and bottom edges, there being a space left between one of said edges of the gooseneck portion and an adjacent arm of the outer member, said hinge members being movable relative to one another through approximately ninety degrees, an elongated arm pivoted at one end on one arm of the outer member and oscillatable in said space in a plane approximately parallel to the aforesaid edge of the gooseneck portion and adjacent arm of the outer member, a roller mounted with freedom for axial and rotary movement on a cylindrical portion of a pin projecting from the aforesaid edge of the gooseneck portion, said arm having a portion disposed in one plane parallel to the aforesaid edge of the gooseneck portion of the inner member engaged by said roller in one portion of the opening movement of the hinge to provide a hold-open action for the inner member in an open position thereof, said arm having another portion in another plane parallel to its first mentioned portion arranged to lie between the outer end of the roller and the adjacent arm of the outer member to prevent displacement of the roller from the pin, and spring means urging said arm toward engagement with said roller.

3. In combination, a hinge comprising a generally U-shaped outer cage member, and an inner member having a gooseneck-shaped end portion pivoted on a pintle disposed substantially at right angles to and supported on the arms of the U-shaped member, the gooseneck portion of said inner member having substantially parallel top and bottom edges, there being a space left between one of said edges of the gooseneck portion and an adjacent arm of the outer member, said hinge members being movable relative to one another through approximately ninety degrees, an elongated arm pivoted at one end on one arm of the outer member and oscillatable in said space in a plane approximately parallel to the aforesaid edge of the gooseneck portion and adjacent arm of the outer member, a roller mounted with freedom for axial and rotary movement on a cylindrical portion of a pin projecting from the aforesaid edge of the gooseneck portion, said arm having a slot provided therein lengthwise thereof and providing on one side of the slot a cam shaped portion in one plane parallel to the aforesaid edge of the gooseneck portion for engagement by said roller in one portion of the opening movement of the hinge to provide a hold-open action for the inner member in an open position thereof, and said arm providing on the other side of the slot another portion in another plane parallel to the cam-shaped portion and arranged to lie between the outer end of the roller and the adjacent arm of the outer member to prevent displacement of the roller from the pin, and spring means urging said arm toward engagement with said roller, said cam-shaped portion of said arm including a depression to receive the roller for a hold-open action and also including on one side of said depression an inclined surface engaged by said roller for an assist action in the door closing movement.

4. In combination, a hinge comprising a generally U-shaped outer cage member, and an inner member having a gooseneck-shaped end portion pivoted on a pintle disposed substantially at right angles to and supported on the arms of the U-shaped member, the gooseneck portion of said inner member having substantially parallel top and bottom edges, there being a space left between one of said edges of the gooseneck portion and an adjacent arm of the outer member, said hinge members being movable relative to one another through approximately ninety degrees, an elongated arm pivoted at one end on one arm of the outer member and oscillatable in said space in a plane approximately parallel to the aforesaid edge of the gooseneck portion and adjacent arm of the outer member, a roller mounted with freedom for axial and rotary movement on a cylindrical portion of a pin projecting from the aforesaid edge of the gooseneck portion, said arm having a portion disposed in one plane parallel to the aforesaid edge of the gooseneck portion of the inner member engaged by said roller in one portion of the opening movement of the hinge to provide a hold-open action for the inner member in an open position thereof, said arm having another portion in another plane parallel to its first mentioned portion arranged to lie between the outer end of the roller and the adjacent arm of the outer member to prevent displacement of the roller from the pin, and spring means urging said arm toward engagement with said roller, the first mentioned portion of said arm including a depression to receive the roller for a hold-open action and also including on one side of said depression an inclined surface engaged by said roller for an assist action in the door closing movement.

References Cited in the file of this patent

UNITED STATES PATENTS

| | | |
|---|---|---|
| 1,357,655 | Sandell | Nov. 2, 1920 |
| 1,694,764 | Beringer | Dec. 11, 1926 |
| 2,314,416 | Muldoon | Mar. 23, 1943 |
| 2,354,789 | Atwood | Aug. 1, 1944 |
| 2,388,021 | Thomas | Oct. 30, 1945 |